Sept. 20, 1971    M. C. FOSSUM    3,605,392
TREE TRIMMER
Filed Aug 28, 1969    3 Sheets-Sheet 2
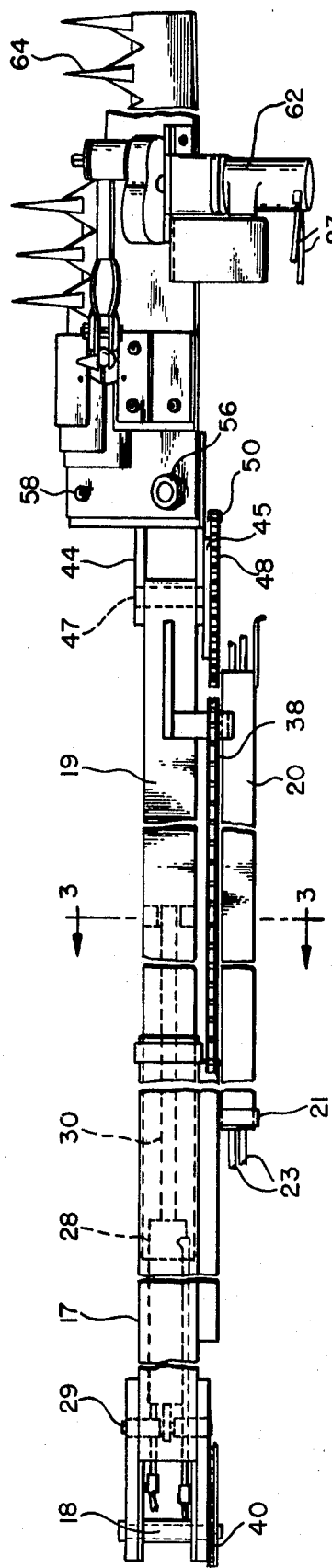
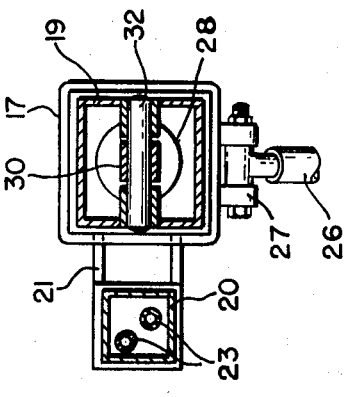
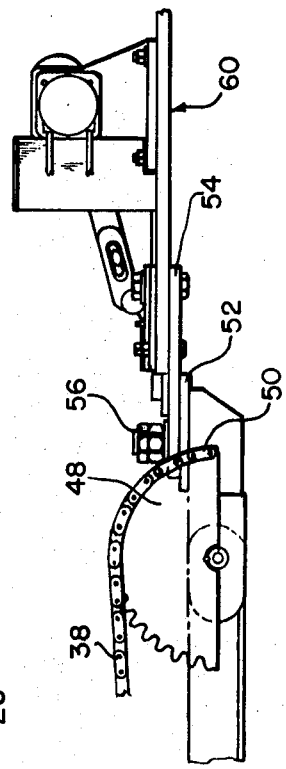
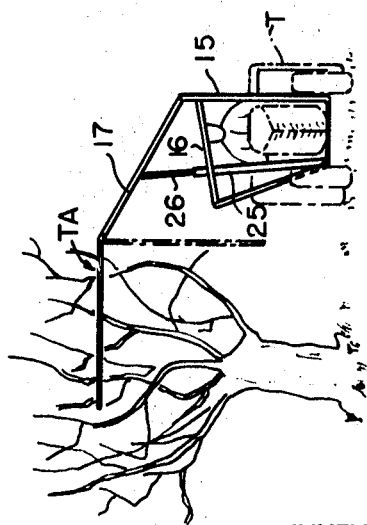
INVENTOR.
MARTIN C. FOSSUM
BY
*Sgd, Berry & Downey*
ATTORNEYS Sept. 20, 1971 M. C. FOSSUM 3,605,392
TREE TRIMMER
Filed Aug. 28, 1969 3 Sheets-Sheet 3
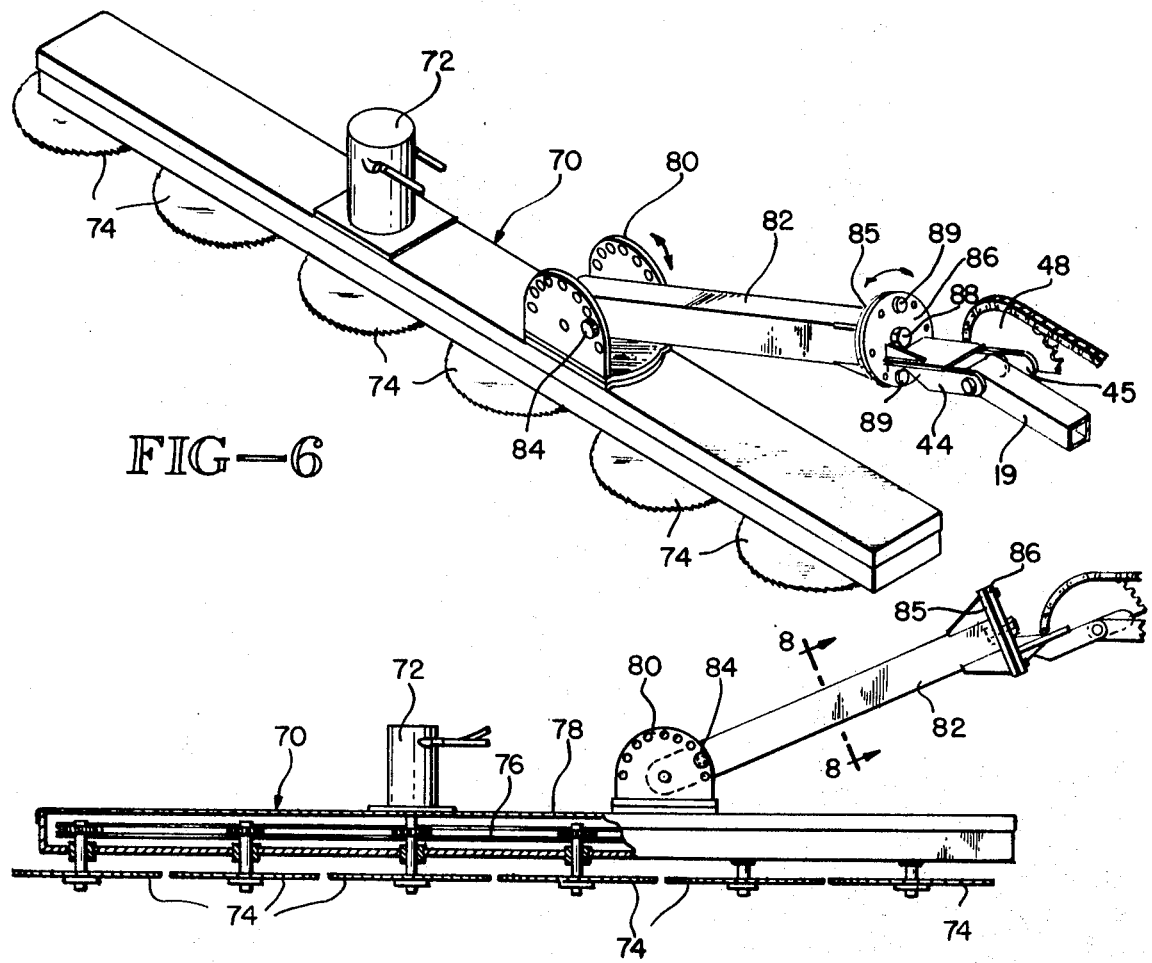
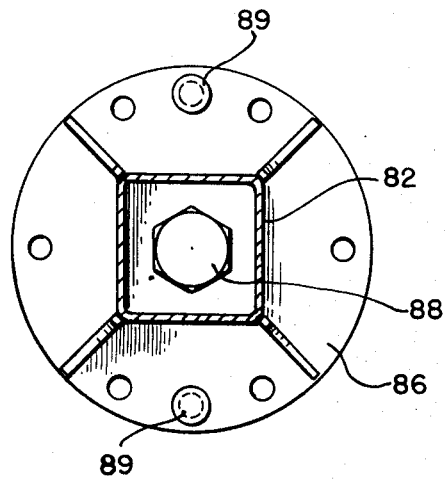
INVENTOR.
MARTIN C. FOSSUM
ATTORNEYS

United States Patent Office 3,605,392
Patented Sept. 20, 1971

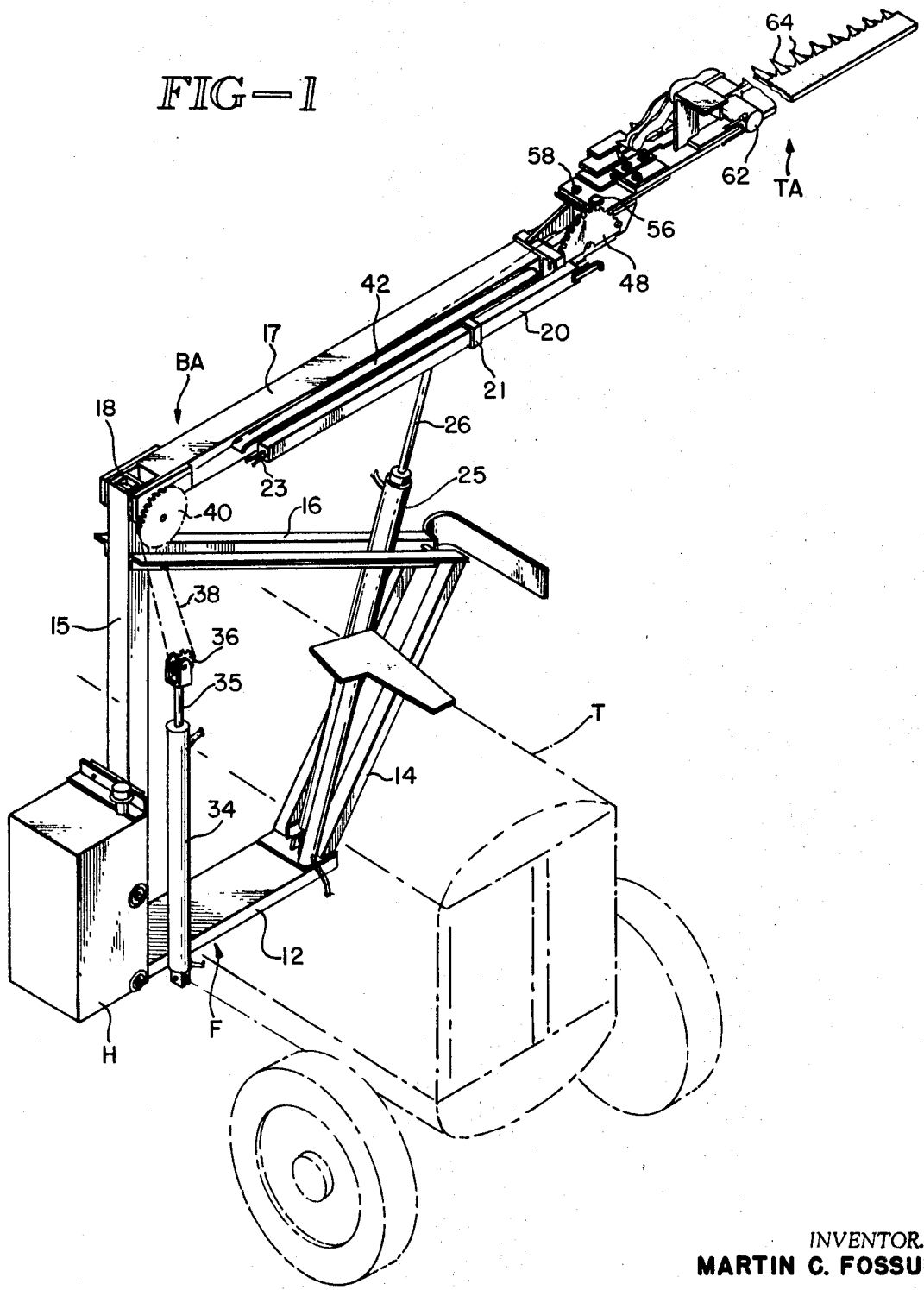

3,605,392
TREE TRIMMER
Martin C. Fossum, Yakima, Wash., assignor of fractional part interest to A. Thor Fossum, Yakima, Wash.
Filed Aug. 28, 1969, Ser. No. 853,862
Int. Cl. A01d 55/32
U.S. Cl. 56—237　　　　　　　　　　　　　　　7 Claims

ABSTRACT OF THE DISCLOSURE

A mobile vehicle is provided with a boom assembly which comprises an upright mast and a telescopically extendable boom pivotably mounted on the mast. A trimmer assembly is mounted for pivotal movement on the outer end of the boom. Hydraulic actuators are provided for extending the boom, pivoting the boom in a vertical plane, and pivoting the trimmer assembly in a vertical plane about the end of the boom. The angular position of the trimmer assembly is related to the extension of the boom. In one embodiment a rotary saw is provided with a first manually adjustable pivotal mounting for rotating the saw about a transverse axis relative to the boom and is provided with a second manually adjustable pivotal mounting for rotating the rotary saw about the longitudinal axis of the boom.

BACKGROUND OF THE INVENTION

Field of the invention

This invention pertains to mobile vehicles for trimming trees, shrubs, brush and the like and, more particularly, to articulated mountings for positioning a trimmer assembly relative to the vehicle.

DESCRIPTION OF THE PRIOR ART

Heretofore mobile trimming vehicles have been limited in their versatility inasmuch as the movement of the trimmer assembly was limited to relatively few positions and the mechanisms required to position the trimmer assembly were expensive and complicated to operate.

SUMMARY OF THE INVENTION

This invention has as a principal object the provision of means on a mobile vehicle for positioning a trimmer assembly in any desired position along a rectangular vertical plane. A primary object of the invention is to provide means for positioning the trimmer assembly in a manner that is simple to operate by controls mounted on the vehicle. The positioning means is advantageously adaptable to various types of cutters including sickle bar or rotary saw types. A unique feature of the invention is that the trimming unit is mounted on the end of an extendable boom and may be rotated about a transverse axis at the end of the boom by a chain and sprocket drive which is connected to the fixed member of the boom. As a result the angular disposition of the trimmer assembly is changed each time the boom is extended or retracted. Controls are provided for the operator to adjust the angular disposition of the trimmer assembly simultaneously with the extension of the boom. Still another unique feature is used in conjunction with the embodiment of the invention that employs a rotary saw and includes a first manually adjustable pivotal mounting for rotating the rotary saw about an axis transverse to the boom and which advantageously permits positioning of the rotary saw into extreme angular dispositions and a second manually adjustable pivotal mounting for rotating the rotary saw about the longitudinal axis of the boom to change its angle-of-attack. Still another unique feature of the invention is the provision of means for extending and retracting the boom incorporated into one of the boom members.

DESCRIPTION OF THE DRAWINGS

FIG. 1 is a perspective illustration of a mobile vehicle embodying the principles of the invention and employing a sickle bar.
FIG. 2 is a fragmentary plan view of the boom and sickle bar shown in FIG. 1.
FIG. 3 is a transverse cross section taken along the line 3—3 of FIG. 2.
FIG. 4 is a fragmentary side elevation of a portion of the boom and sickle shown in FIG. 1.
FIG. 5 is a schematic view illustrating one application of the vehicle shown in FIG. 1.
FIG. 6 is a fragmentary perspective illustrating a rotary saw in use with the vehicle shown in FIG. 1.
FIG. 7 is a side elevation of the rotary saw shown in FIG. 6 with parts broken away for clarity.
FIG. 8 is a transverse section taken along the line 8—8 of FIG. 7.

DESCRIPTION OF THE PREFERRED EMBODIMENTS

In general, the tree trimmer is best shown in FIG. 1 and includes a conventional four wheel vehicle, such as a tractor T, having a frame F. The frame mounts an hydraulic tank H associated with a conventional hydraulic power unit, and a boom assembly BA. A trimmer assembly TA is mounted on the outer end of the boom assembly.

The frame F includes a base plate 12 rigidly mounting a post assembly 14 and a mast 15 of the boom assembly BA. Cross braces 16 extend between the upper end of the post assembly and the mast. The frame is securely mounted to the underside of the vehicle with the mast and post assembly extending upwardly on either side of the vehicle.

The boom assembly BA includes an extendible boom having an inner member 17 pivotally secured to the mast 15 by a pivot bolt 18. An outer member 19 is telescopically received in the inner member 17 and is slidable inwardly and outwardly of the inner member. A tubular housing 20 is secured to the outer member 19 and is slidably received in a bracket 21 mounted on the inner member 17. The tubular housing 20 carries hydraulic conduit 23 to the trimmer assembly TA.

Means for pivoting the boom about the bolt 18 is provided and includes an hydraulic cylinder 25 mounted at its lower end to the base plate 12 and having a piston rod 26 pivotally mounted in brackets 27 that are secured to the underside of the inner member 17. The means for extending the outer member 19 includes an hydraulic cylinder 28 secured at its inner end to a pin 29 fixed to the inner member 17. The cylinder is provided with a piston rod 30 that is secured to a pin 32 (FIG. 2) that is secured to the outer member 19. Means for pivoting the trimmer assembly is provided and includes an hydraulic cylinder 34 fixed at one end to the base frame 12 and having a piston rod 35. A sprocket 36 is rotatably mounted to the outer end of the piston rod 35 and is entrained by a chain 38 that is fixed at one end to the cross brace 16. The other end of the chain 38 is entrained about a sprocket 40 pivotally mounted on the bolt 18 and extends outwardly along the inner and outer boom members, over a guide plate 42 to the trimmer assembly TA, and is connected thereto in a manner to be described.

The trimmer assembly TA includes a pair of spaced ears 44 and 45 that are pivotally mounted on a pin 47 that is secured to the distal end of the outer boom member 19. A semi-circular sprocket 48 is rigidly secured to the ear 45. The free end of the chain 38 is entrained partially about the sprocket 48 and is secured thereto as at 50 in a well known manner. As is readily apparent retraction of the piston rod 35 will rotate the sprocket 48 in a counter clockwise direction, as viewed in FIG. 4, to raise the trimmer assembly TA and extension of the piston rod 35 will allow the trimmer assembly to be lowered by its own weight. Connected to the ears 44 and 45 is a pivot plate 52 which is pivotally joined to a sickle bar mounting plate 54 by a bolt 56. A shear pin 58 is secured to the pivot plate and the sickle bar mounting plate to lock them together but allows relative movement if the shear pin is broken due to the trimmer assembly striking an obstruction. A sickle bar 60, the details of which are not necessary to an understanding of the invention, is mounted to the sickle bar mounting plate 54 in a well known manner. Basically the sickle bar includes an hydraulic drive unit 62 and a pair of reciprocating cutters 64.

The embodiment of the invention shown in FIGS. 6-8 is used with the tractor and boom assembly of the preferred embodiment. The trimmer assembly, however, includes a rotary saw 70 having an hydraulic motor 72 and a plurality of saw blades 74 interconnected by a chain and sprocket drive 76. The rotary saw includes a top plate 78 which is provided with a pair of upstanding adjustment plates 80. A support arm 82 is pivotally mounted between the plates 80 and is locked into one of several positions by a lock bolt 84 passing through apertures in the plates. As is readily apparent the adjustment plates 80 provide for manually changing the angular disposition of the rotary saw about an axis transverse to the outer boom member 19. A second pivotal mounting is provided by a pair of circular plates 85 and 86 rotatably joined by bolt 88. Bolts 89 are secured in aligned apertures in the plates to provide for manual adjustment of the rotary saw about the longitudinal axis of the outer boom member 19.

While the preferred embodiments of the invention have been illustrated and described, various changes and modifications may be made by one skilled in the art without departing from the invention. Accordingly, the appended claims are intended to cover all modifications and variations which fall within their scope.

The embodiments of the invention in which an exclusive property or privilege is claimed are defined as follows:

1. A mobile trimming device comprising:
   a mobile vehicle having a frame;
   a boom assembly mounted on said frame and comprising an upright mast and an extendible boom having telescopic outer and iennr members pivotally secured on said mast, powered means for pivoting said boom in a vertical plane, and powered means for extending said outer member;
   a trimmer assembly pivotally secured to the outer end of said extendible outer member for movement in a vertical plane and comprising a motor-powered cutter and powered means for pivoting said trimmer assembly.

2. The trimming device of claim 1 wherein said cutter includes a reciprocable sickle bar, and including means for releasaby mounting said sickle bar for movement about an axis transverse to said boom axis.

3. The trimming device of claim 1 wherein said cutter includes a plurality of rotary saws, and including means mounting said rotary saw for manual adjustable rotational movement about the transverse axis of said boom.

4. The trimming device of claim 3 further including second means for mounting said rotary saw for manual adjustable rotation about an axis longitudinal to said outer boom.

5. The trimming device of claim 1 wherein said means for pivoting said boom, said means for extending said outer member, and said means for pivoting said trimmer assembly include hydraulic cylinders and piston rods, said inner and outer members including rectangular housings, and wherein said cylinder and piston rod for extending said outer member is mounted within said housings.

6. A positioning mechanism for a trimmer assembly mounted on the end of an extendible boom having an outer member movable longitudinally relative to an inner member, comprising:
   means pivotally mounting said trimmer assembly on the distal end of said outer member for movement in a vertical plane;
   means for rotating said trimmer assembly in said vertical plane, said rotating means including a first sprocket secured to said pivotal mounting means, a second sprocket pivotally mounted on said inner member, a chain fixed to said first sprocket and entrained around said second sprocket, and means for retracting said chain;
   means for extending said outer member and as a result causing rotation of said trimmer assembly; and
   control means for operating said means for retracting said chain and said means for extending said outer member whereby the operator may selectively maintain or change the angular disposition of said trimmer assembly upon extension of said outer member.

7. The positioning mechanism of claim 6 wherein said means for retracting said chain and said means for extending said outer member include hydraulic cylinders and piston rods, the cylinder and piston rod for extending said boom being mounted within said boom.

References Cited

UNITED STATES PATENTS

| | | | |
|---|---|---|---|
| 1,930,934 | 10/1933 | Healy | 56—237 |
| 2,579,862 | 12/1951 | Richardson | 56—237 |
| 2,940,486 | 6/1960 | Whitmore | 56—237 |
| 3,496,709 | 2/1970 | Egbert et al. | 56—237 |

FOREIGN PATENTS

| | | | |
|---|---|---|---|
| 961,137 | 6/1964 | Great Britain | 56—237 |

ANTONIO F. GUIDA, Primary Examiner